(12) United States Patent
Holland et al.

(10) Patent No.: US 12,483,712 B2
(45) Date of Patent: Nov. 25, 2025

(54) ENHANCED REAL-TIME VISUAL QUALITY METRIC GENERATION FOR VIDEO CODING

(71) Applicant: Intel Corporation, Santa Clara, CA (US)

(72) Inventors: James Holland, Folsom, CA (US); Muhammad Hamdan, Palo Alto, CA (US); Atthar Mohammed, Folsom, CA (US); Venkata Prasad, Bangalore (IN); Dmitry Ryzhov, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 847 days.

(21) Appl. No.: 17/457,062

(22) Filed: Dec. 1, 2021

(65) Prior Publication Data

US 2022/0086466 A1 Mar. 17, 2022

(51) Int. Cl.
*H04N 19/196* (2014.01)
*H04N 19/146* (2014.01)
*H04N 19/159* (2014.01)
*H04N 19/172* (2014.01)
*H04N 19/176* (2014.01)

(52) U.S. Cl.
CPC ......... *H04N 19/196* (2014.11); *H04N 19/146* (2014.11); *H04N 19/159* (2014.11); *H04N 19/172* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 7,298,930 B1* | 11/2007 | Erol | G11B 27/28 707/999.001 |
| 2008/0198927 A1* | 8/2008 | Wu | H04N 19/17 375/E7.199 |
| 2009/0148058 A1* | 6/2009 | Dane | H04N 19/577 382/251 |
| 2010/0080459 A1* | 4/2010 | Dai | G06T 5/40 382/170 |
| 2014/0002745 A1* | 1/2014 | Seshadrinathan | H04N 19/85 348/606 |

(Continued)

*Primary Examiner* — Mohammad J Rahman
(74) *Attorney, Agent, or Firm* — Hanley, Flight & Zimmerman, LLC

(57) ABSTRACT

This disclosure describes systems, methods, and devices related to generating visual quality metrics for encoded video frames. A method may include generating respective first visual quality metrics for pixels of an encoded video frame; generating respective second visual quality metrics for the pixels, the respective first visual quality metrics and the respective second visual quality metrics indicative of estimated human perceptions of the encoded video frame; generating a pixel block-based weight for the respective first visual quality metrics; generating a frame-based weight for the respective second visual quality metrics; and generating, based on the respective first visual quality metrics, the pixel block-based weight, the respective second visual quality metrics, and the frame-based weight, a human visual score indicative of a visual quality of the encoded video frame.

20 Claims, 11 Drawing Sheets

(56) References Cited

U.S. PATENT DOCUMENTS

| | | | |
|---|---|---|---|
| 2015/0042752 A1* | 2/2015 | Pettersson | H04N 13/106 |
| | | | 348/42 |
| 2016/0073106 A1* | 3/2016 | Su | H04N 21/8456 |
| | | | 375/240.02 |
| 2016/0212432 A1* | 7/2016 | Wang | H04N 19/154 |
| 2017/0374361 A1* | 12/2017 | Carmel | H04N 19/154 |
| 2019/0116383 A1* | 4/2019 | Shaw | H04N 19/172 |
| 2020/0014956 A1* | 1/2020 | Rosewarne | H04N 19/146 |
| 2020/0029093 A1* | 1/2020 | Zhou | H04N 19/96 |
| 2020/0269133 A1* | 8/2020 | Sun | H04N 19/70 |
| 2020/0389647 A1* | 12/2020 | Mayer-Patel | H04N 19/146 |
| 2021/0144408 A1* | 5/2021 | Giladi | G06T 5/50 |
| 2022/0038747 A1* | 2/2022 | Lee | H04N 19/154 |
| 2022/0116441 A1* | 4/2022 | Liu | H04L 65/1108 |
| 2022/0327692 A1* | 10/2022 | Park | G06T 7/0012 |
| 2023/0037591 A1* | 2/2023 | Villegas | G06T 7/70 |
| 2023/0169325 A1* | 6/2023 | Xie | G06N 3/09 |
| | | | 706/15 |
| 2023/0262240 A1* | 8/2023 | Murra | G06F 9/44526 |
| | | | 375/240.01 |
| 2024/0040160 A1* | 2/2024 | Meardi | H04N 19/33 |

* cited by examiner

ENHANCED REAL-TIME VISUAL QUALITY METRIC GENERATION FOR VIDEO CODING

TECHNICAL FIELD

This disclosure generally relates to systems and methods for video coding and, more particularly, to real-time visual quality metrics for video coding.

BACKGROUND

Video coding can be a lossy process that sometimes results in reduced quality when compared to original source video. Video coding standards are being developed to improve video quality.

DETAILED DESCRIPTION

Figure 1:
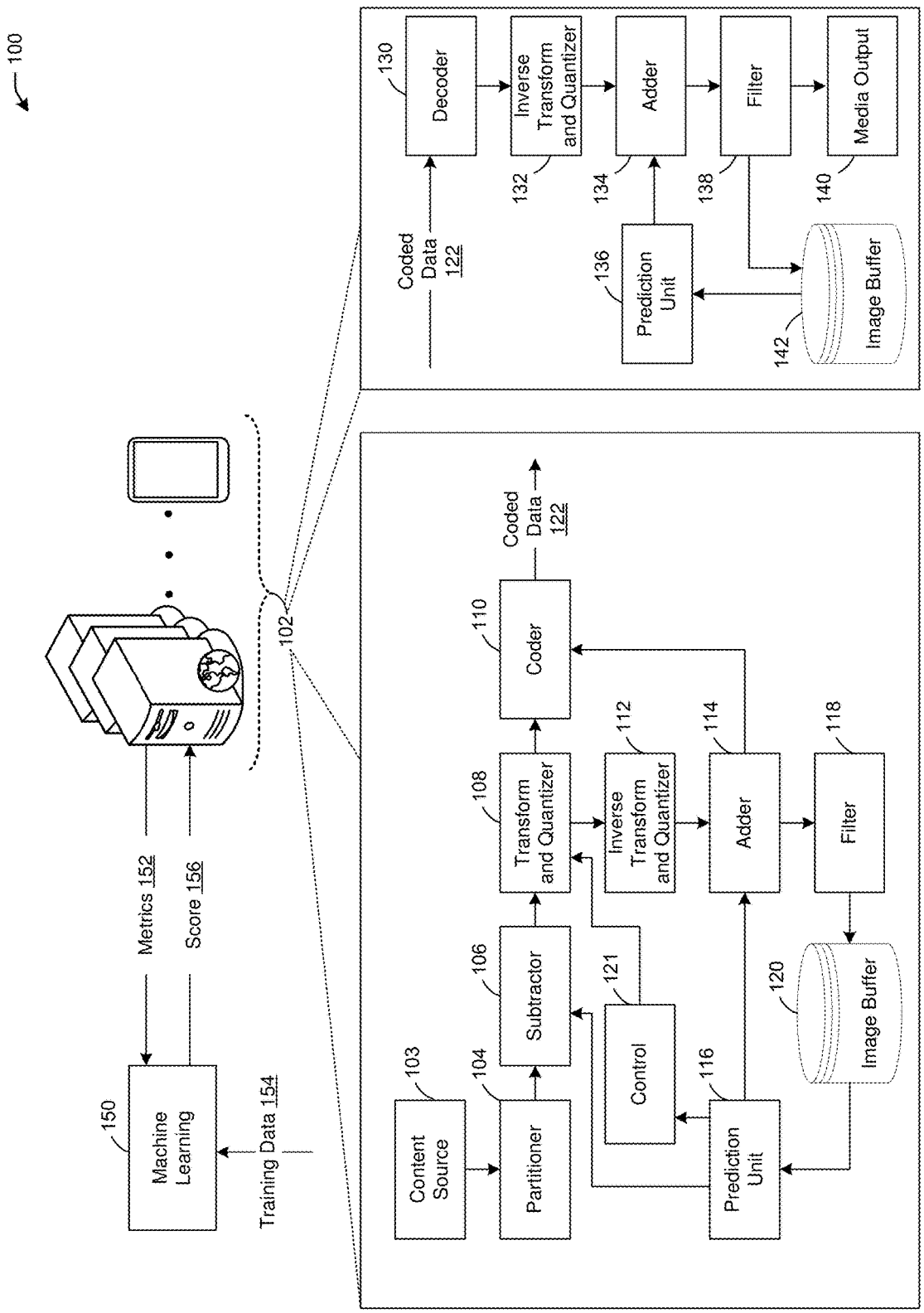
FIG. 1 is an example system illustrating components of encoding and decoding devices, according to some example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Visual quality assessment is critical for graphics and video applications. Of interest to video encoding is the ability to score a perceived human response to a video that has been encoded with lossy compression. For example, the way that automated systems evaluate the quality of encoded video frames may reflect the way that a human viewer might perceive the video frame quality. Some existing techniques to better correlate visual quality assessment with a human visual system have improved video coding, but have significant limitations and are inefficient.

Peak signal to noise ratio (PSNR) and structural similarity index measurement (SSIM) are two quality metrics that assess visual impairment (e.g., caused by video compression) of coded video frames. PSNR does not attempt to model any specific type of visual impairment, but rather provides a simple mathematical model based on the mean squared error (difference) of video images. SSIM improves PSNR by considering luminance, contrast, and structure as independent types of impairment, and combines each together for a composite score. Multi-scale SSIM (MS-SSIM) improves upon SSIM by computing SSIM metrics for multiple downscaled resolutions (e.g., encoding layers), and combines them as a weighted product to mimic the human eye's inability to see artifacts at full resolution. However, artifacts that exist even after downscaling may be more perceivable to humans than to computers. More recent techniques such as video multimethod assessment fusion (VMAF) exploit supervised machine learning to combine multiple metrics together.

However, the metrics used by some existing methods to score a perceived human response are complex and consume significant software cycles, and therefore represent performance overhead that either limits them to offline video encoding to lower resolutions to meet real-time requirements. In addition, the way that automated systems evaluate the quality of coded video frames may not reflect the way that human viewers may perceive the quality of the frames. For example, a human viewer may notice poor quality of a single pixel, whereas some automated systems and the visual quality metrics that they use may determine that a pixel block with a single poor pixel is a high-quality pixel block (e.g., due to averaging visual quality metrics of the pixels in a given pixel block).

While PSNR is simple to compute and can often correlate roughly to subjective vision scores, many different types of impairments may result in the same PSNR score that would each produce different subjective scores from humans. SSIM can identify different types of impairments that a user can observe, which improves its ability to correlate to user scores, but uses an order of magnitude more in computation to produce than PSNR, and performs only slightly better than PSNR alone. SSIM tends to overweight fine details that a human cannot perceive. MS-SSIM uses on the order of two or three times more computation than SSIM because MS-SSIM computes SSIM on multiple levels of downscaled video and further increases the correlation to the subjective video. One disadvantage of MS-SSIM is the compute overhead required to generate, and MS-SSIM often is computed by software running in the central processing unit, unable to keep up with real-time hardware encoding for resolutions at and above high-definition video. Additionally, while MS-SSIM is more accurate than SSIM and PSNR, it still has a significant gap to measure a human visual system impairment score.

Thus, there is a need to efficiently generate visual quality metrics that correlate to subjective scores better than existing methods alone without the overhead of software post-processing of the encoded video to assess the video by generating the scores during hardware video encoding (e.g., in parallel with the encoding). A control feedback loop such as bitrate control (BRC) running in nearby firmware quickly may compare the number of bits spent to encode a frame directly with the approximate visual impairment to a viewer, and to determine whether user requirements are met without subsequent re-encoding.

In one or more embodiments, VMAF methodology improves perceived human response video scoring (e.g., human visual system—HVS—scoring) accuracy significantly over traditional methods because VMAF is trained with human viewers' scores. A coding engine of a graphics processing unit may, in parallel with video frame encoding, calculate the metrics at a per-pixel level and use the metrics as intermediate aggregations to detect range and distribution of visual quality of frames, in contrast with relying on arithmetic means of the metrics and in contrast with generating metrics in a central processing unit. For example, some of a frame's pixels may have a high PSNR, and some of the frame's pixels may have a low PSNR (or another visual quality metric). An arithmetic mean of the PSNRs (or other visual quality metrics) of the frame may be weighted differently than how a human observer would assign weights to the lower PSNR portions of the frame. In this manner, the distribution of visual quality of a frame based on intermediate per-pixel metrics may enhance the quality metric analysis of encoded video frames. The VMAF-selected pixel-level metrics are on the same order of magnitude complexity as the MS-SSIM computation, which limits the performance during real-time coding operations if the metrics are determined in software in the same manner that MS-SSIM is limited to off-line applications or high software computation overhead. These techniques also increase latency, which may not be feasible for ultra-low delay scenarios (e.g., low-latency applications).

In one or more embodiments, a fixed function encoder may have access to an original unmodified source video and its resultant encoded output picture. The present disclosure may add dedicated hardware logic (e.g., to a graphics processing unit) to compute visual impairment metrics on-the-fly without additional memory reads or increased delay to the user. In addition, many different metrics may be computed, allowing for post-processing to blend the metrics in a similar manner as performed by VMAF. Accurately scoring subjective quality of videos unlocks further compression, which can be used to make smaller videos of the same subjective quality, or higher subjective quality videos at the same size. The present disclosure may provide such enhancements with negligible overhead in terms of power, latency, or performance by computing the metrics within the encoder itself (e.g., rather than externally) during encoding. The hardware may aggregate the metrics data in novel ways that leverage insights that the encoder has and that are not always observable by external quality computations. The combination of such hardware metrics and how they are aggregated has been shown to have accuracy similar to VMAF.

In one or more embodiments, video box (VDBOX) advanced quality metrics (AQM) may be unified across codecs that support low-power encoding in a VDBOX (e.g., the low-power encoding path of an encoder's VDBOX referred to as VDENC) and/or pack (PAK) (e.g., quantization, entropy encoding, pixel reconstruction, and motion compensation), and on-the-fly/in-line metric generation for key objective quality metrics used during encoding. VDBOX AQM (VDAQM)) may be inside a graphics processing unit's VDBOX, and all PAK's (i.e., all past present future hardware codecs) may provide both source and reconstructed pixels to VDAQM. In addition, the present disclosure provides a "standalone" mode to access VDAQM standalone to bypass PAK to support image comparisons outside of VDENC+PAK usages. The metrics may be part of a feedback loop to the BRC and advanced constant quantization parameter (CQP) and/or quality-defined variable bitrate (QVBR) kernels to adjust encoder settings in real-time. In addition, the metrics may be used in silicon-based quality parameter training aligned to specific content types. Collectively, the metrics may enable machine learning-optimized encoding, as there are ways to minimize bits, but quantifying visual quality may be required to optimize them together. The metrics reported may be both frame-based summaries (e.g., totals), zone/class-based, and block-based surfaces. VDAQM may support PSNR, SSIM and MS-SSIM, and may include more metrics.

In one or more embodiments, the VDAQM may be codec-agnostic, avoiding the need for more separate gates for coding. The VDAQM may use advanced metrics such as MS-SSIM, and the VDAQM may aggregate the results of the analysis of the metrics using frame-based reporting, class-based reporting, and/or mapping.

In one or more embodiments, machine learning may use a model with multiple layers, such as multilayer perceptrons for neural networks, a support vector machine (SVM), random forest, or the like (e.g., a linear regression with machine learning). The machine learning model may receive visual features generated by the VDAQM (e.g., as shown in Table 1 below), and may use the multiple layers to generate a score (e.g., HVS score) for the visual quality metrics (e.g., a motion score). The layers may be trained using human responses as training data. For example, the training data may include human viewer scores representative of the visual quality metrics, such as PSNR, SSIM, and the like. Based on the VDAQM-generated metrics and the human training data, the machine learning model may generate the score to be used by a coder/decoder (e.g., for selection of coding parameters).

In one or more embodiments, VDAQM may include: 1) Unifying all encoder quality metrics in one unit that all PAK's may share, and generating metrics "on-the-fly" without round trips to memory and without slowing down the VDENC or PAK; 2) Expanding beyond the PSNR metric to support metrics which track more closely to the human visual system (HVS) starting with SSIM and MS-SSIM; and 3) Aggregating statistics in useful ways to reduce computing overhead, summarizing the quality data with a per-frame SSIM histogram, per-class minimum and mean SSIM (e.g., where each class can be generically defined based on application needs), and per-block reporting, allowing for targeted quantization parameter (QP) adjustments on a coding unit (CU) or macroblock (MB) basis.

In one or more embodiments, dedicated encoder hardware may be used to encode video and, in parallel, compute coding metrics (e.g., using VDENC). The dedicated encoder hardware may receive source video and encode the source video for a bitstream. Inputs to the dedicated encoder hardware may include the source video and a decoded view (e.g., a view of the encoded video as would be seen by a decoder). In this manner, the encoder may include VDENC, VDAQM, and high efficiency video coding (HEVC)/H.265 controller (HuC) engines on the same hardware, resulting in legible performance degradation because the metrics are generated inside the encoder rather than remotely (e.g., remote from the encoder).

In one or more embodiments, VDAQM may be an engine (e.g., a computer program) that determines PSNR, SSIM, and MS-SSIM metrics for reconstructed images (e.g., video frames). The VDAQM engine may operate in parallel with other encoder engines, such as multi-format codec (MFX), HCP, AVP, VDENC, and HuC pipelines, and operates on live reconstructed pixels for AVC, HEVC, AV1, and other codecs. The VDAQM engine may operate in a standalone mode, allowing it to operate when the other PAK engines are disabled.

In one or more embodiments, the VDAQM engine may aggregate coding metrics for a neural network to generate a score (e.g., HVS score) that is not just a per-pixel score averaged for a frame of video. In particular, the score may use intermediate per-pixel data rather than a mean score for a frame. The machine learning of the neural network may identify relationships between the metrics for both inter-coded and intra-coded frames (e.g., an inter-coded metric may matter more than an intra-coded metric, or vice versa). For example, machine learning may use feature regression or neural network visual analytics. The VDAQM engine may provide a feedback loop in which it writes to memory while encoding occurs. The reporting of the metrics by the VDAQM engine may include zone or class-based reporting, or mapping (e.g., heat map) reporting.

In one or more embodiments, the VDAQM engine may use coding metrics in an enhanced way. For example, the coding metrics may include mean values, such as PSNR and SSIM sum of squared errors (SSE) for a Y'UV color model (e.g., Y' luma, and U and V chroma values), SSIM histograms, per-class minimums and means for luma and chroma, per-class block occurrence counts, and minimum SSIM per block. MS-SSIM may be determined by aggregating the SSIM of original and downscaled layers. SSIM may include luma (L), contrast (C), and structure (S) components. MS-SSIM uses an exponent that may not be supported by hardware, so the software may combine SSIM results to generate MS-SSIM values. The hardware may capture the intermediate terms that allow for post-processing to determine the overall MS-SSIM by using the following Equation (1):

$$\text{MS-SSIM}(I,J) = [l_M(I,J)]^{\alpha M} \Pi_{i=1}^{M} [(c_i)(I,J)]^{\beta_i} [s_i(I,J))]^{\gamma_i} \quad (1);$$

where I, J are two pictures to compare, M is the total number of layers, and i of 1 is the original picture resolution. The SSIM of the i-th layer is defined as $L_i^* C_i^* S_i$. $\beta$, $\gamma$, and $\alpha$ are constants that may vary, and examples of $\beta$, $\gamma$, and $\alpha$ are provided further herein. The $l_M$, $c_i$, and $s_i$ terms refer to the L, C, and S terms of the SSIM metric. The product of $c_i$ and $s_i$ is determined per-layer i. $\beta$, $\gamma$, and $\alpha$ represent weight factors for each layer, in which the weight factors indicate the importance of the SSIM values are per-layer. For example, machine learning may be used to adjust the weights based on whether a human viewer is more likely or less likely to notice an artifact at a lower or higher encoding layer.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is an example system 100 illustrating components of encoding and decoding devices, according to some example embodiments of the present disclosure.

Referring to FIG. 1, the system 100 may include devices 102 having encoder and/or decoder components. As shown, the devices 102 may include a content source 103 that provides video and/or audio content (e.g., a camera or other image capture device, stored images/video, etc.). The content source 103 may provide media (e.g., video and/or audio) to a partitioner 104, which may prepare frames of the content for encoding. A subtractor 106 may generate a residual as explained further herein. A transform and quantizer 108 may generate and quantize transform units to facilitate encoding by a coder 110 (e.g., entropy coder). Transform and quantized data may be inversely transformed and inversely quantized by an inverse transform and quantizer 112. An adder 114 may compare the inversely transformed and inversely quantized data to a prediction block generated by a prediction unit 116, resulting in reconstructed frames. A filter 118 (e.g., in-loop filter for resizing/cropping, color conversion, de-interlacing, composition/blending, etc.) may revise the reconstructed frames from the adder 114, and may store the reconstructed frames in an image buffer 120 for use by the prediction unit 116. A control 121 may manage many encoding aspects (e.g., parameters) including at least the setting of a quantization parameter (QP) but could also include setting bitrate, rate distortion or scene characteristics, prediction and/or transform partition or block sizes, available prediction mode types, and best mode selection parameters, for example, based at least partly on data from the prediction unit 116. Using the encoding aspects, the transform and quantizer 108 may generate and quantize transform units to facilitate encoding by the coder 110, which may generate coded data 122 that may be transmitted (e.g., an encoded bitstream).

Still referring to FIG. 1, the devices 102 may receive coded data (e.g., the coded data 122) in a bitstream, and a decoder 130 may decode the coded data, extracting quantized residual coefficients and context data. An inverse transform and quantizer 132 may reconstruct pixel data based on the quantized residual coefficients and context data. An adder 134 may add the residual pixel data to a predicted block generated by a prediction unit 136. A filter 138 may filter the resulting data from the adder 134. The filtered data may be output by a media output 140, and also may be stored as reconstructed frames in an image buffer 142 for use by the prediction unit 136.

Referring to FIG. 1, the system 100 performs the methods of intra prediction disclosed herein, and is arranged to perform at least one or more of the implementations described herein including intra block copying. In various implementations, the system 100 may be configured to undertake video coding and/or implement video codecs according to one or more standards. Further, in various forms, video coding system 100 may be implemented as part of an image processor, video processor, and/or media processor and undertakes inter-prediction, intra-prediction, predictive coding, and residual prediction. In various implementations, system 100 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1 (AV1), H.266 (Versatile Video Coding, or VVC), DASH (Dynamic Adaptive Streaming over HTTP), and others. Although system 100 and/or other systems, schemes or processes may be described herein, the present disclosure is not necessarily always limited to any particular video coding standard or specification or extensions thereof except for IBC prediction mode operations where mentioned herein.

Still referring to FIG. 1, the system 100 may include a machine learning model 150 for evaluating visual quality metrics 152 generated by the devices 102. The machine learning model may receive the visual quality metrics 152 and human training data 154 as inputs, and may generate HVS scores (e.g., motion scores 156) based on the inputs. In one or more embodiments, the machine learning model 150 may be a multi-layer perceptron neural network model as further described with respect to FIG. 7. The devices 102 may use the scores 156 to select coding parameters.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the system 100 may be an encoder where current video information in the form of data related to a sequence of video frames may be received to be compressed. By one form, a video sequence (e.g., from the content source 103) is formed of input frames of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The partitioner 104 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 100 may receive an input frame from the content source 103. The input frames may be frames sufficiently pre-processed for encoding.

The system 100 also may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

The output of the transform and quantizer 108 may be provided to the inverse transform and quantizer 112 to generate the same reference or reconstructed blocks, frames, or other units as would be generated at a decoder such as decoder 130. Thus, the prediction unit 116 may use the inverse transform and quantizer 112, adder 114, and filter 118 to reconstruct the frames.

The prediction unit 116 may perform inter-prediction including motion estimation and motion compensation, intra-prediction according to the description herein, and/or a combined inter-intra prediction. The prediction unit 116 may select the best prediction mode (including intra-modes) for a particular block, typically based on bit-cost and other factors. The prediction unit 116 may select an intra-prediction and/or inter-prediction mode when multiple such modes of each may be available. The prediction output of the prediction unit 116 in the form of a prediction block may be provided both to the subtractor 106 to generate a residual, and in the decoding loop to the adder 114 to add the prediction to the reconstructed residual from the inverse transform to reconstruct a frame.

The partitioner 104 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AV1 coding of an entire I-frame or I-slice, spatial or intra-prediction is used, and in one form, only from data in the frame itself.

In various implementations, the prediction unit 116 may perform an intra block copy (IBC) prediction mode and a non-IBC mode operates any other available intra-prediction mode such as neighbor horizontal, diagonal, or direct coding (DC) prediction mode, palette mode, directional or angle modes, and any other available intra-prediction mode. Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The prediction unit 116 may select previously decoded reference blocks. Then comparisons may be performed to determine if any of the reference blocks match a current block being reconstructed. This may involve hash matching, SAD search, or other comparison of image data, and so forth. Once a match is found with a reference block, the prediction unit 116 may use the image data of the one or more matching reference blocks to select a prediction mode. By one form, previously reconstructed image data of the reference block is provided as the prediction, but alternatively, the original pixel image data of the reference block could be provided as the prediction instead. Either choice may be used regardless of the type of image data that was used to match the blocks.

The predicted block then may be subtracted at subtractor 106 from the current block of original image data, and the resulting residual may be partitioned into one or more transform blocks (TUs) so that the transform and quantizer 108 can transform the divided residual data into transform coefficients using discrete cosine transform (DCT) for example. Using the quantization parameter (QP) set by the system 100, the transform and quantizer 108 then uses lossy resampling or quantization on the coefficients. The frames and residuals along with supporting or context data block size and intra displacement vectors and so forth may be entropy encoded by the coder 110 and transmitted to decoders.

In one or more embodiments, a system 100 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks, for example. The context also may include prediction modes for individual blocks, other partitions such as slices, inter-prediction motion vectors, partitions, quantization parameters, filter information, and so forth. The system 100 may process the bitstream with an entropy decoder 130 to extract the quantized residual coefficients as well as the context data. The system 100 then may use the inverse transform and quantizer 132 to reconstruct the residual pixel data.

The system 100 then may use an adder 134 (along with assemblers not shown) to add the residual to a predicted block. The system 100 also may decode the resulting data using a decoding technique employed depending on the coding mode indicated in syntax of the bitstream, and either a first path including a prediction unit 136 or a second path that includes a filter 138. The prediction unit 136 performs intra-prediction by using reference block sizes and the intra displacement or motion vectors extracted from the bitstream, and previously established at the encoder. The prediction unit 136 may utilize reconstructed frames as well as inter-prediction motion vectors from the bitstream to reconstruct a predicted block. The prediction unit 136 may set the correct prediction mode for each block, where the prediction mode may be extracted and decompressed from the compressed bitstream.

In one or more embodiments, the coded data 122 may include both video and audio data. In this manner, the system 100 may encode and decode both audio and video.

In one or more embodiments, while the coder 110 is generating the coded data 122, the system 100 may generate coding quality metrics indicative of visual quality (e.g., without requiring post-processing of the coded data 122 to assess the visual quality). Assessing the coding quality metrics in parallel with the coding performed by the coder 110 may allow a control feedback such as BRC (e.g., facilitated by the control 121) to compare the number of bits spent to encode a frame to the coding quality metrics. When one or more coding quality metrics indicate poor quality (e.g., fail to meet a threshold value), such may require re-encoding (e.g., with adjusted parameters). The coding quality metrics indicative of visual quality may include PSNR, SSIM, MS-SSIM, VMAF, and the like. The coding quality metrics may be based on a comparison of coded video to source video. The system 100 may compare a decoded version of the encoded image data to a pre-encoded version of the image data. Using the CUs or MBs of the encoded image data and the pre-encoded version of the image data, the system 100 may generate the coding quality metrics, which may be used as metadata for the corresponding video frames. The system 100 may use the coding quality metrics to adjust encoding parameters, for example, based on a perceived human response to the encoded video. For example, a lower SSIM may indicate more visible artifacts, which may result in less compression in subsequent encoding parameters.

It is understood that the above descriptions are for purposes of illustration and are not meant to be limiting.

Figure 2:
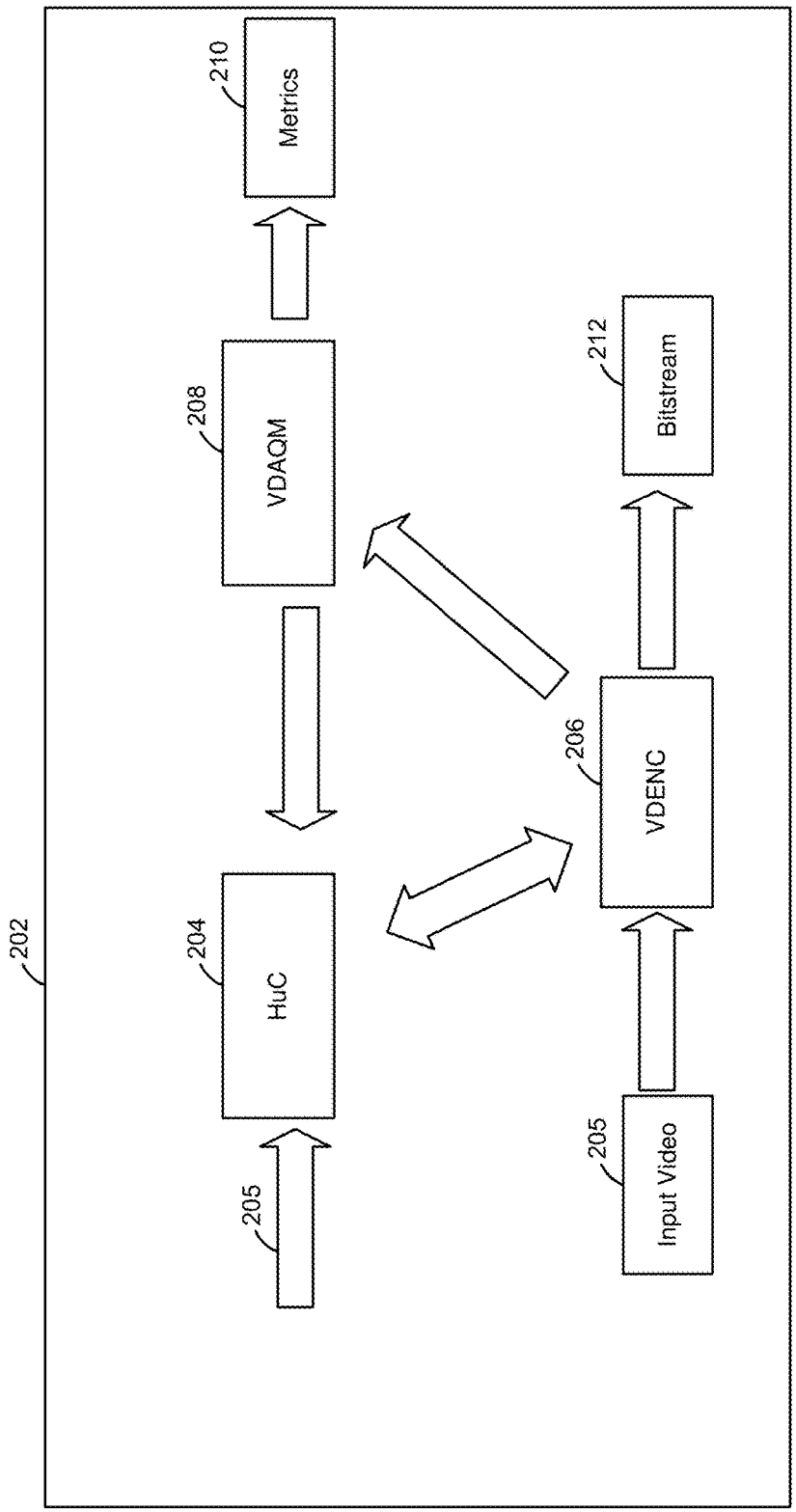
FIG. 2 depicts exemplary components of a video box for video coding, in accordance with one or more example embodiments of the present disclosure.

FIG. 2 depicts exemplary components of a video box (VDBOX) 202 for video coding, in accordance with one or more example embodiments of the present disclosure.

Referring to FIG. 2, the VDBOX 202 may be referred to as a multi-format codec (MFX). The components also may include a HuC 204 (e.g., representative of the control 121 of FIG. 1) that may receive user controls 205 as inputs (e.g., inter or intra frame type, quantization parameters, frame headers, reference picture selections, etc.), and that may allow for a graphics processing unit (e.g., see FIG. 11) to handle functions such as bitrate control and header parsing instead of a central processor. The components may include a VDENC 206 pipeline, which may represent a low-power encoding path, and dedicated hardware for computing and searching. For example, the VDENC 206 may use a motion search. The components may include a VDAQM 208 pipeline—a newly added feature for enhanced quality analysis—and may support metrics 210 such as PSNR, SSIM, and MS-SSIM, among others. The HuC 204 may select coding parameters based on the metrics 210.

In one or more embodiments, because of the metrics 210 from the VDAQM 208, a generated bitstream 212 may be enhanced. For example, when any of the metrics 210 are above or below respective threshold values, such may indicate that the coding parameters used in the frames whose evaluation is the source of the metrics 210 should be adjusted (e.g., resulting in re-encoding with adjusted parameters) and/or whether subsequent frames should be encoded using adjusted parameters. In particular, the metrics 210 generated by the VDAQM 208 may be fed back to the HuC 204, which may determine whether or not to re-encode a frame based on the metrics 210. In contrast, existing techniques may rely on metadata indicating whether or not a target frame size was achieved, but such a determination does not indicate whether a visual quality was achieved, which is where the VDAQM 208 and the metrics 210 improve existing techniques. In one or more embodiments, the metrics 210 may be fed to another machine learning model for further analysis (e.g., a per-pixel analysis of an entire frame).

In one or more embodiments, the VDBOX 202 may perform bitstream decoding, intra prediction, motion estimation, quantization, entropy coding, pixel reconstruction, and motion compensation. In this manner, the VDBOX 202 may represent multiple components shown and described with respect to FIG. 1.

Figure 5:
FIG. 5 shows "diagnostic" views of a frame using a per-pixel block analysis at multiple layers, in accordance with one or more example embodiments of the present disclosure.
Figure 5:
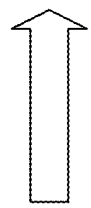
Figure 5:

In one or more embodiments, the metrics 210 may be fed back to the HuC 204 (e.g., for coding parameter decisions to implement at the VDENC 206) and/or may be offloaded (e.g., the diagnostic views shown in FIG. 5).

In one or more embodiments, the HuC 204 may represent an application-specific integrated circuit (ASIC), allowing for the metrics to be determined and evaluated using logic gates rather than software, for example. In this manner, the generation and use of the metrics 210 may be performed "on-chip" for a graphics processor rather than requiring a central processing unit to receive the metrics 210 and perform actions based on the metrics 210.

Figure 3:
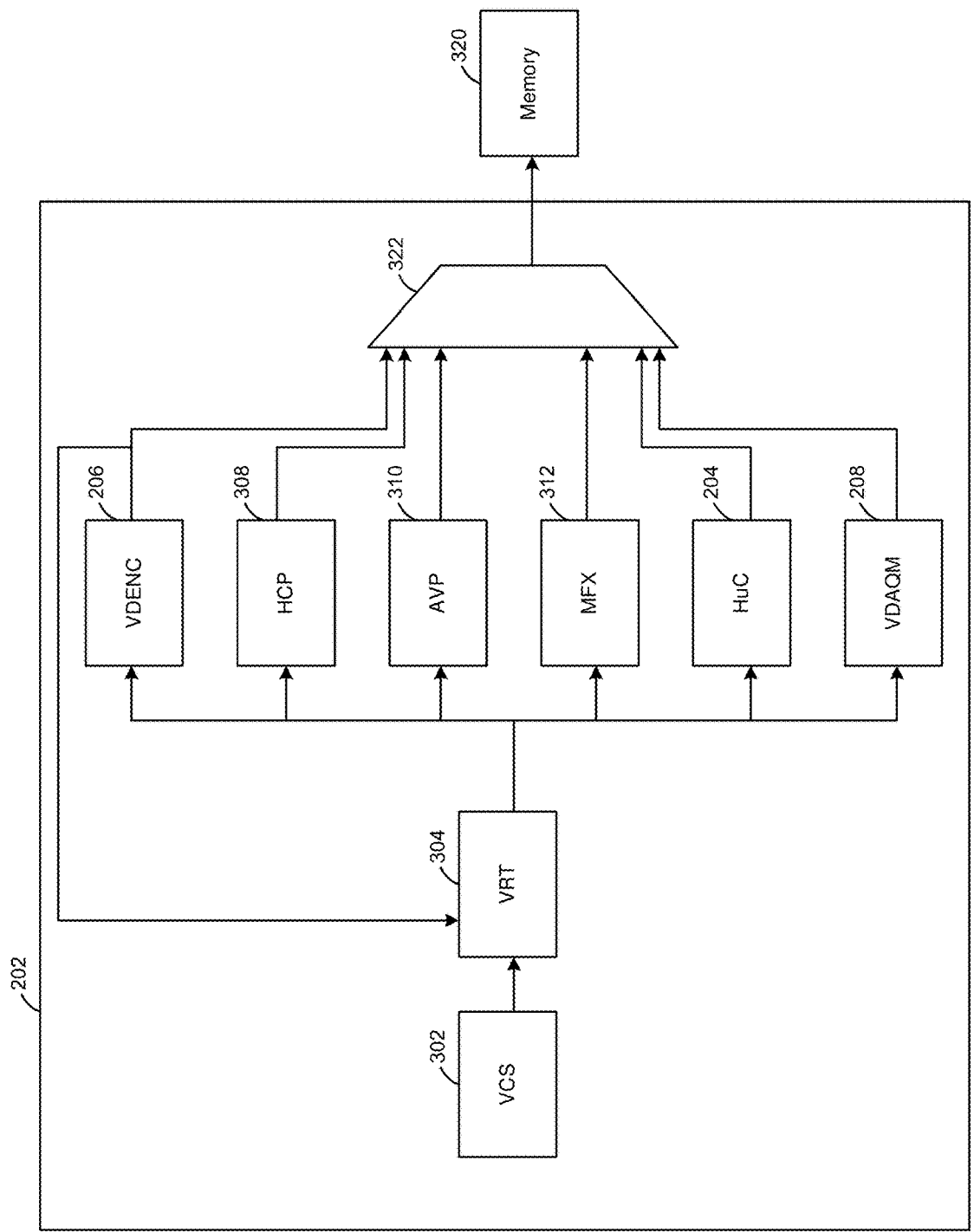
FIG. 3 depicts exemplary components of the video box of FIG. 2, in accordance with one or more example embodiments of the present disclosure.

FIG. 3 depicts exemplary components of the VDBOX 202 the encoder 200 of FIG. 2, in accordance with one or more example embodiments of the present disclosure.

Referring to FIG. 3, the VDBOX 202 of the encoder 200 may include a video command streamer (VCS) 302 for fetching, decoding, and dispatching data. The VDBOX 202 also may include a VRT router 304, the VDENC 206 pipeline of FIG. 2, an HEVC codec pipeline (HCP) 308, an AVP codec 310 pipeline, an MFX codec 312 pipeline, the HuC 204 of FIG. 2, and the VDAQM 208. As shown, the VDAQM 208 may be in parallel with the other pipelines and may work on live reconstructed pixels for AVC, HEVC, AV1, and other codecs. The VDAQM 208 may operate even when the other pipelines/engines are not enabled. The pipelines/engines shown may communicate with memory 320 to share coding metrics. In this manner, the pipelines/engines may share and generate metrics in real-time without round-trips to the memory 320. The metrics from the pipelines/engines of the VDBOX 202 may be communicated using a multiplexer 322, and the metrics may be fed back to the VRT router 304. The VDENC 206 pipeline may generate an encoded bitstream along with reconstructed images, which may be fed back (e.g., to the VDAQM 208) for use by the other codec pipelines. The VDAQM 208 may generate the visual quality metrics based on the encoded bitstreams and reconstructed images generated by the codec pipelines, including by the VDENC 206, and may write the visual quality metrics to the memory 320. In one or more embodiments, the visual quality metrics may be represented by the metrics 152 of FIG. 1. The VDAQM 208 may generate the visual quality metrics in parallel with the coding.

In one or more embodiments, the video coding metrics of the pipelines of the VDBOX 202 may include at least some of the metrics shown below in Table 1.

TABLE 1

Video Coding Metrics:

| Metric | Shorthand Name | Chroma Format | Accumulation | Group Type |
|---|---|---|---|---|
| Mean (SSE.Y) | PSNR | Y | Mean | Global (frame) |
| Mean (SSE.U) | PSNR | U | Mean | Global (frame) |
| Mean (SSE.V) | PSNR | V | Mean | Global (frame) |
| Mean (L.Y * C.Y * S.Y) | SSIM per-layer | Y | Mean | Global (layer) |
| Mean (L.U * C.U * S.Y) | SSIM per-layer | U | Mean | Global (layer) |
| Mean (L.V * C.V * S.V) | SSIM per-layer | V | Mean | Global (layer) |
| Mean (C.Y * S.Y) | SSIM per-layer | Y | Mean | Global (layer) |
| Mean (C.Y * S.Y) | SSIM per-layer | U | Mean | Global (layer) |
| Mean (C.Y * S.Y) | SSIM per-layer | V | Mean | Global (layer) |
| Hist[loc(min (blkYL * C * S))]++ | SSIM Histogram | Y or (Y * 6 + U + V) >> 3 | Count | Global (frame) |
| Per-class min(min (blkYL * C * S)) | SSIM per class | Y or (Y * 6 + U + V) >> 3 | Min | Class (frame) |
| Per-class mean(min (blkYL * C * S)) | SSIM per class | Y or (Y * 6 + U + V) >> 3 | Mean | Class (frame) |
| Per-class 4 × 4 blk occurrence count | SSIM per class | N/A | Count | Class (frame) |
| Min(blkYL * C * S) | SSIM per block | Y or (Y * 6 + U + V) >> 3 | N/A | Local (blk) |

The term "blk" may refer to a pixel block.

As shown in Table 1, the metrics generated by the VDAQM 208 (e.g., the metrics 210 of FIG. 2) may include PSNR for entire frames, SSIM on a per-layer basis, an SSIM histogram for entire frames, per-class SSIM minimums, means, and pixel block occurrence counts (e.g., "blk" in Table 1 may refer to a 4×4 pixel block or another size), and SSIM minimums per pixel block. The metrics may be generated based on a comparison of a coded frame and a reconstructed version of the frame. SSIM has five layers, so the metrics may be used to determine which layers to keep or not keep. For cost savings, some SSIM calculations may not include all five layers (e.g., layers 1-4 may be evaluated instead). For example, mean (L.Y*C.Y*S.Y), mean (L.U*C.U*S.Y), mean (L.V*C.V*S.V), and mean (C.Y*S.Y) in Table 1 may be intermediate SSIM values on a per-layer basis, and the aggregate SSIM may be determined based on the intermediate values. Because the PSNR is determined for layer 0, the SSIM may not be needed for layer 0, which is a benefit (e.g., 4× computational relief) because the SSIM for layer 0 is computationally expensive. In this manner, SSIM may be used for some layers and supplemented with PSNR for some layers.

Referring to the histogram of Table 1, the histogram (e.g., shown in FIG. 4) the SSIM may be determined for each block of pixels. The lowest pixel SSIM (e.g., a value between 0 and 1, with 0 being lower quality and 1 being higher quality) of the block may represent the quality of the block (e.g., as opposed to an average SSIM of the block). The histogram counts across a frame the number of blocks that fall into the different histogram bins.

Referring to the per-class metrics of Table 1, the intra-coded blocks may be aggregated together, and the inter-coded blocks may be aggregated together. Instead of using the average SSIM of all the inter-coded blocks and the average SSIM of all the intra-coded blocks, the mean and the worst (e.g., lowest SSIM) block may be used. For example, the average SSIM may be low, but the worst SSIM may not be very low, so there may not be a significant outlier having poor quality. Alternatively, an average SSIM may be average, but there may be a low worst-case SSIM value that the average would overlook.

Referring to the Min(blkYL*C*S) of Table 1, this metric represents a per-block SSIM (e.g., a diagnostic view), as shown in FIG. 5.

In one or more embodiments, the VDAQM 208 may calculate the metrics at a per-pixel level and use the metrics as intermediate aggregations to detect range and distribution of visual quality of frames, in contrast with relying on arithmetic means of the metrics. For example, half of a frame's pixels may have a high PSNR, and half of the frame's pixels may have a low PSNR (or another metric). An arithmetic mean of the PSNRs (or other metric) of the frame may be weighted differently than how a human observer would weigh the lower PSNR portions of the frame. In this manner, the distribution of visual quality of a frame based on intermediate per-pixel metrics may enhance the quality metric analysis of encoded video frames and provides an improvement over use of an arithmetic mean of an entire frame.

In one or more embodiments, the VDAQM 208 may be codec-agnostic, avoiding the need for more separate gates for coding. The VDAQM 208 may use advanced metrics such as MS-SSIM, and the VDAQM 208 may aggregate the results of the analysis of the metrics using frame-based reporting, class-based reporting, and/or mapping. The metrics 210 may be evaluated by the HuC 204 of FIG. 2, which may be low-power, rather than requiring a supercomputer or some other more complex processing unit to evaluate.

Figure 4:
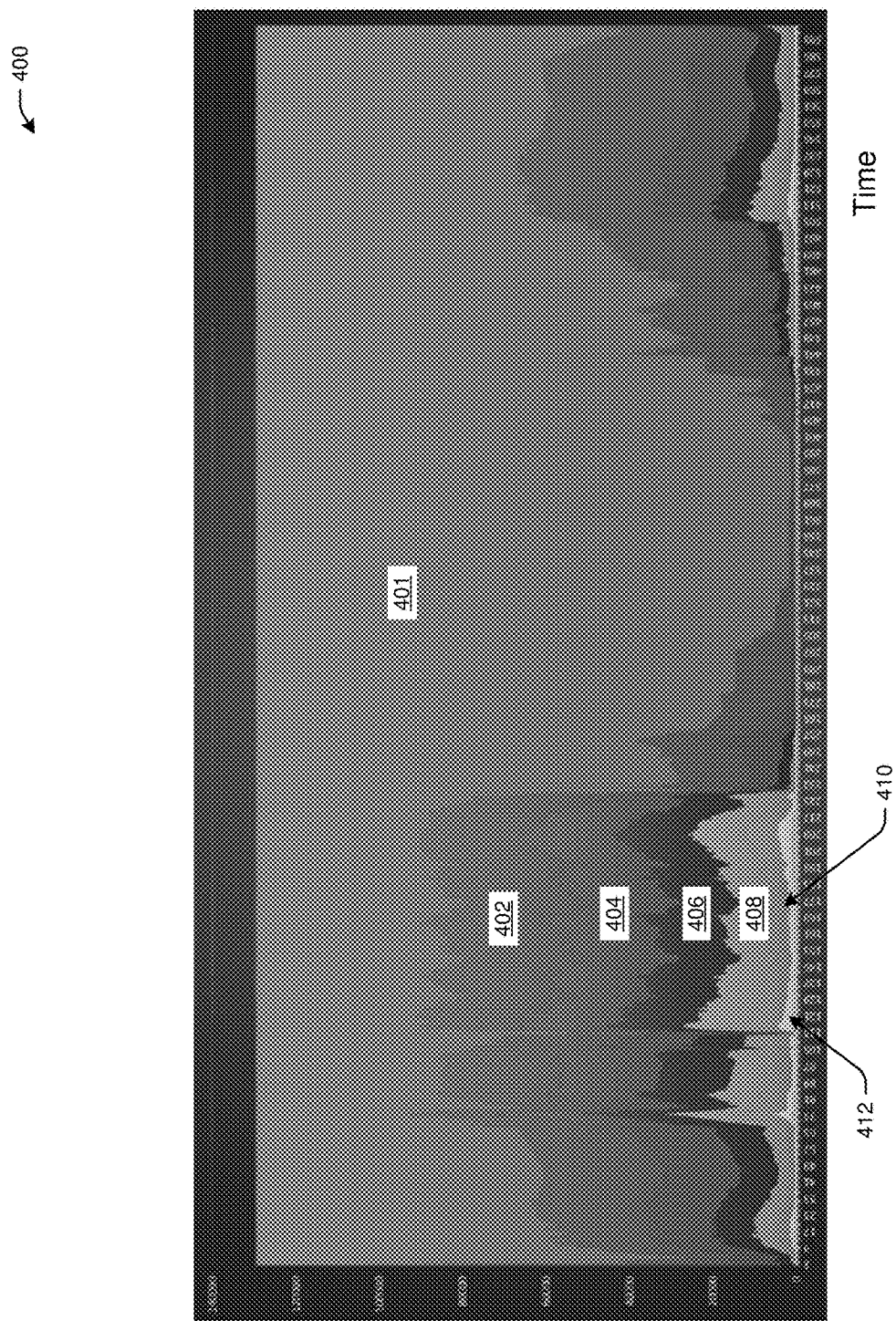
FIG. 4 shows an example histogram for structural similarity index measurements, in accordance with one or more example embodiments of the present disclosure.

FIG. 4 shows an example histogram 400 for structural similarity index measurements, in accordance with one or more example embodiments of the present disclosure.

Referring to FIG. 4, the histogram 400 may represent the SSIM histogram referenced in Table 1 above. The histogram is generated at a global (e.g., frame) level based on the lowest SSIM value of any pixel in a pixel block, and the histogram 400 shows the frame-level SSIM over time. For example, a lower SSIM may indicate more visible artifacts in a video frame. The per-frame SSIM histogram is important to provide the distribution of visual quality over a given frame. Relying on an average SSIM, in contrast, may be misleading because a small portion of a frame may be the portion on which a human may judge the overall quality of the entire frame. Instead of simply showing a time-graph of the overall SSIM, the histogram 400 shows a distribution of quality over time in more detail (e.g., the SSIM per bin over time).

Still referring to FIG. 4, the histogram 400 shows multiple SSIM bins: SSIM bin 401, SSIM bin 402, SSIM bin 404, SSIM bin 406, SSIM bin 408, SSIM bin 410, and SSIM bin 412. The number of SSIM bins is exemplary and not meant to be limiting. As shown, most of the frame falls within SSIM bin 401 (e.g., a percentage of the frame falls within SSIM bin 401). For example, SSIM bin 401 may be for pixel blocks whose lowest SSIM value is above a highest threshold value. SSIM bin 402 may be for pixel blocks whose lowest SSIM value is above a next highest threshold value. SSIM bin 404 may be for pixel blocks whose lowest SSIM value is above a next highest threshold value. SSIM bin 406 may be for pixel blocks whose lowest SSIM value is above a next highest threshold value. SSIM bin 408 may be for pixel blocks whose lowest SSIM value is above a next highest threshold value. SSIM bin 410 may be for pixel blocks whose lowest SSIM value is above a next highest threshold value. SSIM bin 412 may be for pixel blocks whose lowest SSIM value is above a next highest threshold value. In this manner, SSIM bins 410 and 412 may be indicative of pixel blocks having the lowest SSIM values, which represent a small portion of the frame, whereas most of the frame's pixel blocks fall within the higher quality SSIM bin 401. By using the lowest SSIM pixel value of a pixel block instead of the average SSIM value of a pixel block, the worst pixel blocks may be identified using this technique. The histogram 400 therefore represents a simplified manner of reporting a distribution of visual quality across a coded frame. The histogram 400 may be used to generate scalar values provided to a neural network (e.g., the metrics 152 fed to the machine learning model 150 of FIG. 1). The histogram 400 represents SSIM values for a single layer of a frame, and other histograms may be generated for the other layers based on the respective SSIM values at those layers.

FIG. 5 shows diagnostic views (e.g., "X-ray" or "quality" views) of a frame using a per-pixel block analysis at multiple layers, in accordance with one or more example embodiments of the present disclosure. The diagnostic views include diagnostic view 500 from layer 0, and diagnostic view 550 from layer 2, and the block sizes may be 16×16 or some other size. The data of the diagnostic views 500 and 550 may be generated based on the Min(blkYL*C*S) metric of Table 1 for the different respective layers, meaning that the diagnostic views 500 and 550 may be based on the "worst" pixel per pixel block (e.g., the pixel having the lowest metric of any respective human visual metric in a block may be considered representative of the block). The brighter the area of an diagnostic view, the more intense the visual artifact in the frame. The layer 2 view may be based on downscaling twice from layer 0 (e.g., downscaling from layer 0 to layer 1, and downscaling again from layer 1 to layer 2). The downscaling is why some of the more intense artifacts of the diagnostic view 500 may be less intense in the diagnostic view 550. The diagnostic views 500 and 550 may be used as part of a pre-processing stage (e.g., to feed into a model for evaluating the metrics), and may be processed internally (e.g., using graphics processing hardware) or may be "offloaded" (e.g., to a central processing unit), allowing for human feedback regarding how a human viewer would score the frame. The model (e.g., the machine learning model 150 of FIG. 1, implemented remotely or within the graphics processing circuitry), may generate pixel weights at a block-based or frame-based level (e.g., see Table 1) for the respective metrics. In this manner, weights for different metrics used at different blocks, layers, or overall frames may differ based on the weights, which may be adjusted on-the-fly during encoding based on the generated metrics and human feedback.

MS-SSIM may be determined by aggregating the SSIM values of the original and four downscaled layers. SSIM uses L, C, and S terms, and the MS-SSIM Equation (1) above uses an exponent that the coding hardware may not support. Accordingly, the software may combine the results to generate the MS-SSIM value.

PSNR is relatively consistent when subjective video enhancements are present or not present, whereas VMAF is higher when the subjective video enhancements are present. In contrast, the VMAF and the MS-SSIM are more consistent with one another (e.g., a higher VMAF maps to a higher MS-SSIM), which is a reason for relying on MS-SSIM data, as MS-SSIM may provide a better HVS score before needing to include a more advanced metric such as VMAF in encoder hardware.

Figure 6:
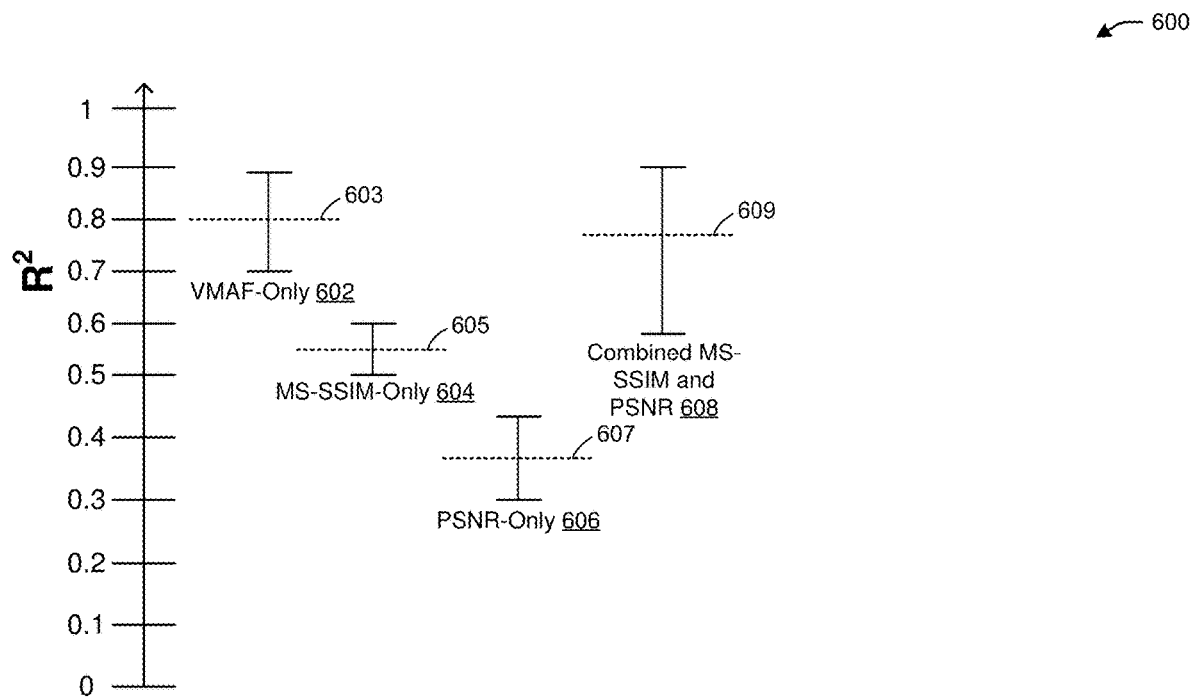
FIG. 6 shows a variability chart of human visual metrics used to evaluate encoded video frames, in accordance with one or more example embodiments of the present disclosure.

FIG. 6 shows a variability chart 600 of human visual metrics used to evaluate encoded video frames, in accordance with one or more example embodiments of the present disclosure.

Referring to FIG. 6, the variability chart 600 shows an $R^2$ test (e.g., with respect to a human visual score). As shown, VMAF-only 602 metrics (e.g., having a mean value 603) correlate stronger to a human perception (e.g., have a higher $R^2$ value) that MS-SSIM-only 604 metrics (e.g., having a mean value 605) or PSNR-only metrics 606 (e.g., having a mean value 607). However, combining MS-SSIM and PSNR metrics (e.g., combined metrics 608 having a mean value 609) may provide an even higher correlation with human visual scoring than VMAF in some situations, and is at least comparable to the range of VMAF-only 602 metrics. In this manner, the combined metrics of Table 1 allow for a strong correlation with human viewer scoring of encoded video frames, comparable with high-quality VMAF metrics.

Figure 7:
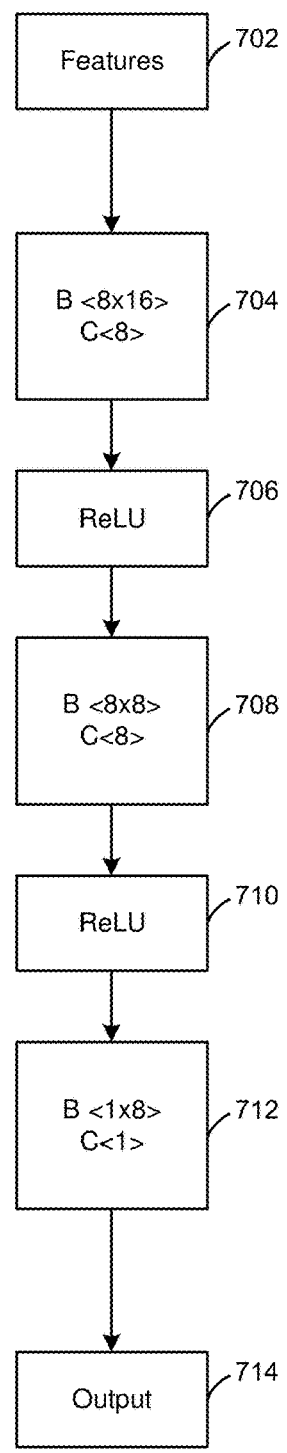
FIG. 7 shows multiple layers of the machine learning model of FIG. 1, in accordance with one or more example embodiments of the present disclosure.

FIG. 7 shows multiple layers of the machine learning model 150 of FIG. 1, in accordance with one or more example embodiments of the present disclosure.

Referring to FIG. 7, features 702 (e.g., the metrics 210 generated by the VDAQM 208 of FIG. 2, and/or other non-VDAQM human visual quality metrics, such as motion indicative of a difference between a current image and a previous image, a co-located sum of absolute differences, motion-estimated sum of absolute differences, inter versus intra percentage, and the like, representing metrics proportional to temporal redundancy between respective frames, which may be metrics generated by the VDENC 206 or elsewhere) may be input into a first layer 704 (e.g., a layer of a MLP, in which the machine learning model 150 may represent a MLP). For example, the VDAQM features 702 may include up to 16 features, or some other number (e.g., a 1×16 feature array), such as fame YUV layer 0 PSNR, SSIM Y LCS layers 1-4, SSIM Y CS layers 1-4, SSIM histogram bin counts, as shown in Table 1. In addition, the features may include an overall temporal correlation score (e.g., motion score metrics proportional to temporal redundancy between respective frames, as generated by the VDENC 206 of FIG. 2). The first layer 704 may have eight neurons and may use matrix multiplication (e.g., GEMM—general matrix multiplication) to apply matrices (e.g., matrix B<8×16> for the 16 features based on user respondent scores, and matrix C<8> for the eight neurons). The output of the first layer 704 (e.g., the GEMM of matrix B and matrix C in the first layer 704) may be input to a rectified linear unit (ReLU) 706, which may output an input value when the input value is greater than zero, and may output a zero for an input value less than or equal to zero. The output of the ReLU 706 may be input into a second layer 708, which may have eight neurons and may use matrix multiplication (e.g., GEMM) to apply matrices (e.g., matrix B<8×8> for the 16 features based on user respondent scores, and matrix C<8> for the eight neurons). The output of the second layer 708 (e.g., the GEMM of matrix B and matrix C in the second layer 708) may be input to a ReLU 710, which may output an input value when the input value is greater than zero, and may output a zero for an input value less than or equal to zero. The output of the ReLU 710 may be input into a third layer 712, which may have one neuron and may use matrix multiplication (e.g., GEMM) to apply matrices (e.g., matrix B<1×8> for the 16 features based on user respondent scores, and matrix C<1> for the single neuron). The output 714 of the third layer 712, and of the machine learning model 150, may be a score (e.g., HVS score).

In one or more embodiments, testing shows that the $R^2$ (coefficient of determination) for the output 714 is on par with VMAF, and is better than MS-SSIM and PSNR.

In one or more embodiments, the machine learning model 150 may be trained as follows. The machine learning model 150 may be a fully-connected neural network MLP with ReLU. The parameters of the machine learning model 150 may be initialized based on a given speed. Stochastic gradient descent (SGD) with a fixed learning rate may optimize the machine learning model 150, and mean absolute loss may be used by the machine learning model 150 to determine error. The machine learning model 150 may be trained for a finite number of epochs, and a patience hyperparameter may be used for early stopping. The data may be normalized between 0 and 1, and fed into the machine learning model 150 for training. The performance of the machine learning model 150 may be evaluated based on the sum of absolute errors (SAE). The parameters and the machine learning model 150 may be simple enough to run on a HuC with or without vectorization, and may be instantiated in coding hardware.

Figure 11:
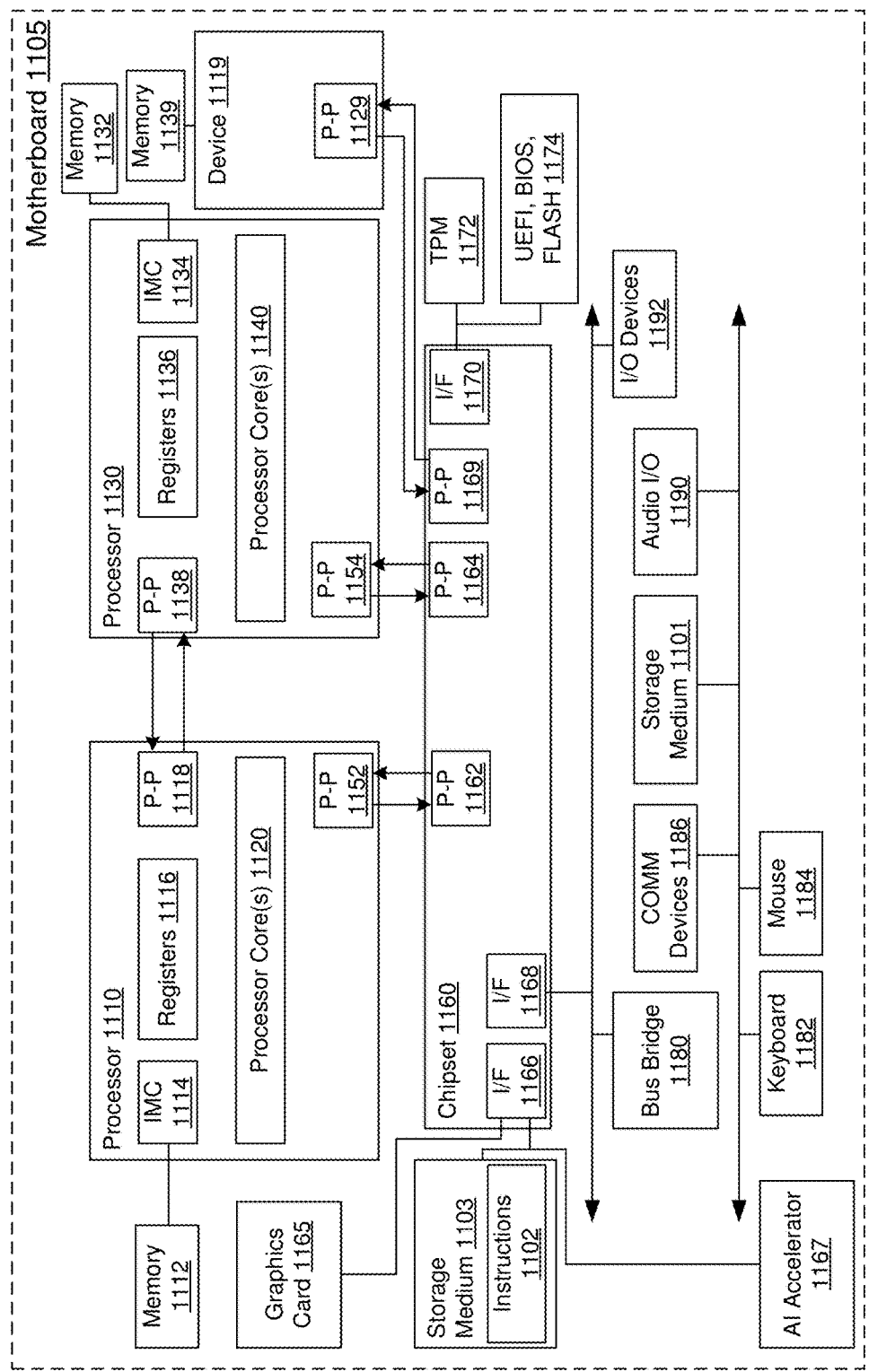
FIG. 11 illustrates an embodiment of an exemplary system, in accordance with one or more example embodiments of the present disclosure.

In one or more embodiments, the machine learning model 150 may be implemented at least in part by circuitry on the devices 102 of FIG. 1. For example, as shown in FIG. 11, an artificial intelligence (AI) accelerator 1167 may provide machine learning functionality to evaluate the VDAQM features 702 and determine the output 714 for use in evaluating whether to re-encode a coded frame.

Figure 8:
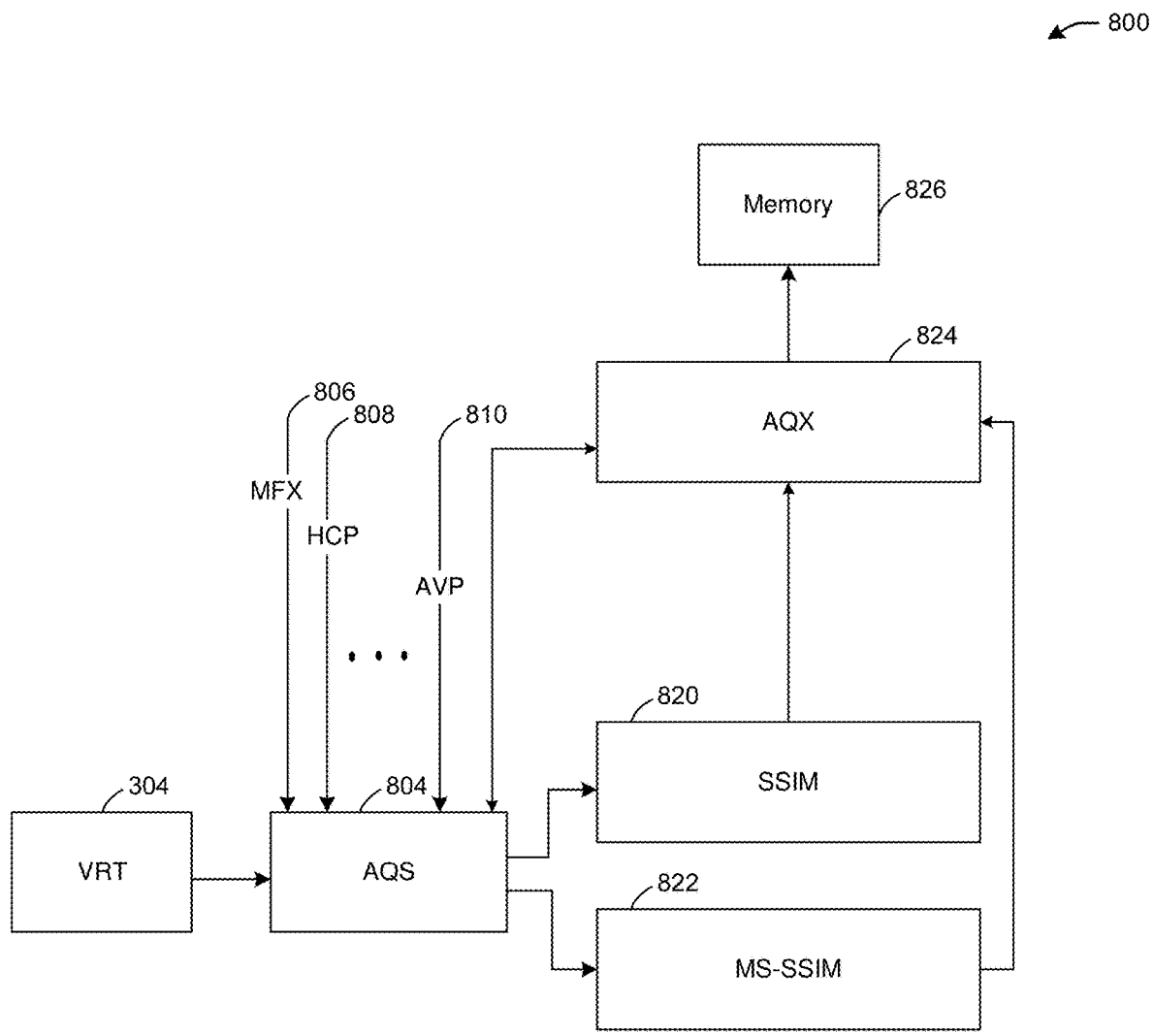
FIG. 8 depicts exemplary components of an encoder, in accordance with one or more example embodiments of the present disclosure.

FIG. 8 depicts exemplary components 800 of an encoder, in accordance with one or more example embodiments of the present disclosure.

For example, the components 800 may represent some of the components of FIG. 1 and FIG. 3.

Referring to FIG. 8, the VRT router 304 of FIG. 3 may communicate with an advanced quality metric setup (AQS) 804. The AQS 804 may receive pixel data from multiple codecs, such as MFX 806, HCP 808, and AVP 810 (e.g., similar to FIG. 3). Using the pixel data from the multiple codecs (e.g., the metrics based on the coded frames compared to the reconstructed frames), the AQS 804 may determine SSIM 820 and MS-SSIM 822 in parallel, and both SSIM 820 and MS-SSIM 822 may be provided to an advanced quality metrics controller (AQX) 824, which may write the metrics to memory 826 (e.g., similar to FIG. 3).

Figure 9:
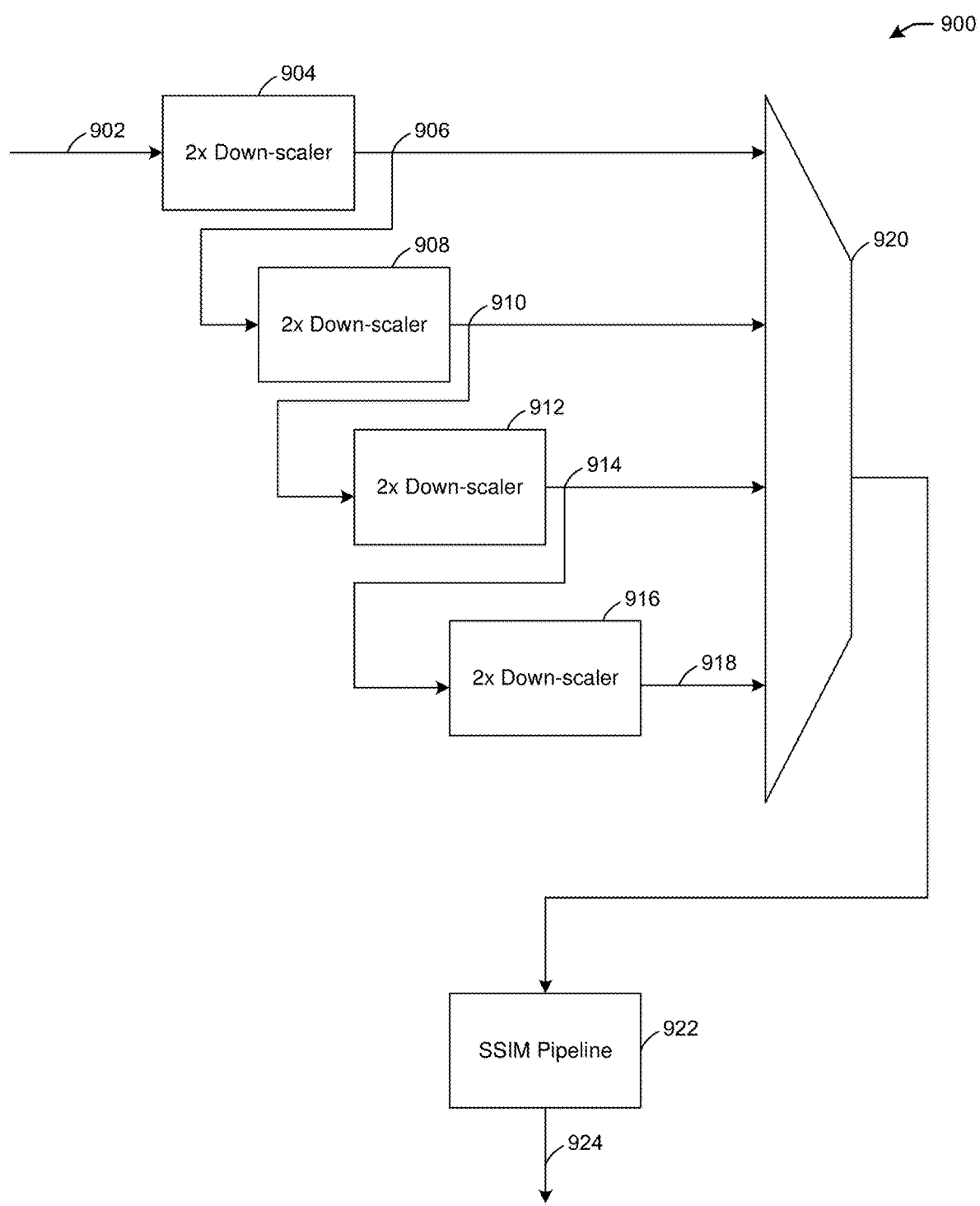
FIG. 9 depicts exemplary components of an encoder for downscaling, in accordance with one or more example embodiments of the present disclosure.

FIG. 9 depicts exemplary components 900 of an encoder for downscaling, in accordance with one or more example embodiments of the present disclosure.

For example, the components 900 may represent some of the components of FIG. 1 and FIG. 3.

Referring to FIG. 9, source video 902 may be a first size (e.g., 8×8), and a first 2× downscaler 904 may downscale the source video 902 to a second size 906 (e.g., 4×4). A second 2× downscaler 908 may downscaler the second size 906 video to a third size 910 (e.g., 2×2). A third 2× downscaler 912 may downscaler the video of the third size 910 to video of a fourth size 914 (e.g., 1×1). A fourth 2× downscaler 916 may downscale the video of the fourth size 914 to a fifth size 918. The downscaled video may be sent to a multiplexor 920, and may represent various layers of the video. The output of the multiplexed video layers may be input to a SSIM pipeline 922 (e.g., similar to the SSIM 820 of FIG. 8) to determine an SSIM 924 for the video.

Figure 10:
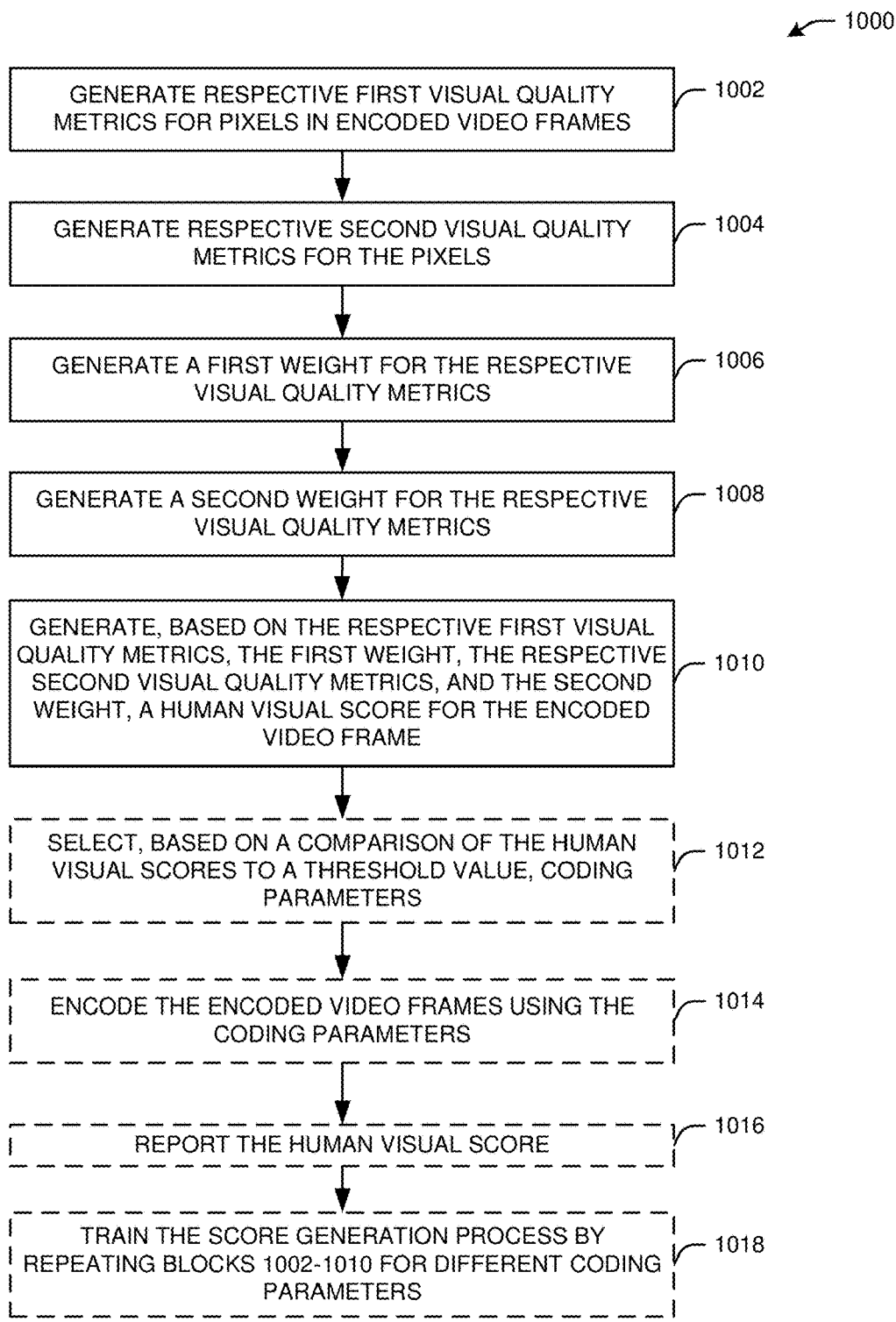
FIG. 10 illustrates a flow diagram of an illustrative process for enhanced real-time visual quality metric generation for video coding, in accordance with one or more example embodiments of the present disclosure.

FIG. 10 illustrates a flow diagram of illustrative process 1000 for enhanced real-time visual quality metric generation for video coding, in accordance with one or more example embodiments of the present disclosure.

At block 1002, a device (e.g., the graphics card 1165 of FIG. 11) may determine respective first visual quality metrics for pixels of an encoded video frame. The first visual quality metrics may be any metric shown in Table 1, for example, and may be determined on a per-pixel basis at a pixel block level or frame level as shown in Table 1. The first visual quality metrics may be for one or multiple coding layers, and may include or not include each layer (e.g., the PSNR for layer 0, but not for layers 1-4). The device may determine the respective first visual quality metrics for pixels of multiple blocks of pixels in one or multiple video frames.

At block 1004, the device may determine respective second visual quality metrics for the pixels, the respective first visual quality metrics and the respective second visual quality metrics indicative of estimated human perceptions of the encoded video frame. The second visual quality metrics may be for one or multiple coding layers, and may include or not include each layer (e.g., the SSIM for layers 1-4, but not for layer 0). The device may determine the respective second visual quality metrics for pixels of multiple blocks of pixels in one or multiple video frames. Other visual quality metrics for the pixels may be determined (e.g., third metrics, fourth metrics, etc.) and aggregated using block-based and/or frame-based aggregation (e.g., according to various weights as described further below).

At block 1006, the device may generate a first weight for the respective first visual quality metrics. At block 1008, the device may generate a second weight for the respective second visual quality metrics. The first and second weights may be any combination of block-based or frame based weights as shown in Table 1. For example, one of the respective visual quality metrics may be a histogram, per-class (e.g., inter- or intra-coded classes), or per-block metric (e.g., SSIM values) using a pixel block based weight. One of the respective visual quality metrics may be mean values (e.g., PSNR or SSIM) for an entire frame (e.g., using a frame-based weight). The weights may be generated based on which metrics are most likely to correspond to how a human viewer views a frame. For example, training data and/or additional feedback data from human viewers may indicate that certain visual artifacts are more noticeable than others and affect their human quality scores of a frame. One visual quality metric may be more indicative of the human score than another visual quality metric. For example, a frame-based PSNR or SSIM may provide a higher quality score for a frame than a block-based score that relies on a minimum pixel metric for a pixel block, and the human viewer score for the frame may be lower than the frame-based PSNR or SSIM metric (or closer to the block-based metric), so the block-based weight may be set higher than the frame-based weight.

At block 1010, the device may determine, based on the respective first visual quality metrics, the first weight (e.g., applied to the respective first visual quality metrics), the respective second visual quality metrics, and the second weight (e.g., applied to the respective second visual quality metrics) a human visual score indicative of a visual quality of the encoded video frame (e.g., HVS score). For example, the score may include a weighted sum or weighted average of the respective visual quality metrics. The score may be determined using machine learning, either locally or remotely. The machine learning may include a MLP as shown in FIG. 7. The score may be based on that weights that indicate the importance of certain visual quality metrics. For example, the first visual quality metrics may be weighted higher or lower than the second visual quality metrics based on human training data indicating a human perception of the visual quality of encoded video frames. When one or more visual quality metrics for one or more pixel blocks are above or below a threshold for a frame, such may indicate a strong or poor quality of the frame. For example, a higher SSIM may indicate higher quality, so an SSIM threshold may be 0.5, where a lowest SSIM for a pixel in a frame may be compared to the threshold to determine whether to re-encode the frame. Similar thresholds may be used for other visual quality metrics. When one or more visual quality metrics indicate, based on threshold value comparisons, that one or more pixels of a frame are likely to be perceived by human viewers as having poor visual quality, the device may facilitate re-encoding of the frame. For example, when one or more metrics indicate higher quality based on threshold value comparisons, the human visual score may be higher. Because the weights may be at the per-block and/or per-frame levels, the aggregation of the visual metrics used to generate the human visual score may be enhanced. For example, whereas some techniques may aggregate the metrics at only a per-block or per-frame level, the device may aggregate the metrics at multiple levels, combining the scores weighted at the different levels to generate a score using combined metrics and that is more consistent with a human viewer's perception (e.g., as shown in FIG. 6). The human visual score also may reflect an overall temporal correlation score (e.g., motion score metrics proportional to temporal redundancy between respective frames, as generated by the VDENC 206 of FIG. 2). In this manner, the human visual score may be based on a combination of the VDAQM 208 metrics and at least one metric proportional to the temporal redundancy between respective frames. For example, the greater the motion between the respective frames, the lower the human visual score (e.g., because a human may perceive the greater motion as blurry, etc.).

At block 1012, optionally, the device may select coding parameters with which to code (e.g., when the evaluation of blocks 1002-1010 are part of a look-ahead process of projecting the score if the frame were to be encoded using certain coding parameters) or re-encode the frame when a comparison of the human visual score to a threshold indicates that the visual quality of the frame is too low. For example, when the human visual score is below a score threshold (e.g., because one or more SSIM values, and/or other metrics, are below respective threshold values), the device may re-encode the frame with less lossy compression to reduce the likelihood of visual impairments being noticeable to a human viewer.

At block 1014, optionally, the device may code (for the first time or a subsequent time) the frame using the selected coding parameters.

At block 1016, optionally the device may report the human visual score, for example, to the HuC 204 of FIG. 2. The HuC 204 may use the human visual score to select coding parameters for the same or other video frames. In this manner, the generation of the metrics, human visual score, and selection of coding parameters may be performed "locally" on the graphics processing hardware without requiring the metrics to be generated or evaluated elsewhere (e.g., in a central processing unit separate from the graphics processor), allowing for on-the-fly metric generation during the encoding process.

At block 1018, optionally, the device may train the score generation process of block 1010 by repeating blocks 1002-1010 to generate one or more additional human visual scores based on different coding parameters applied to the frame. For example, the respective visual quality metrics of blocks 1002 and 1004 may be based on if the frame were encoded using first parameters. The device may determine the visual quality metrics of the same frame if the frame were encoded using different coding parameters, and may generate the human visual score for any set of coding parameters applied to the video frame. Based on the various human visual scores for different coding parameters, the device may continue to evaluate frames for human visual scores until optimal or otherwise satisfactory coding parameters are identified for encoding (e.g., until a human visual score satisfies a score threshold). In this manner, because the steps of process 1000 may be performed within the graphics processing circuitry, the device may evaluate multiple different coding parameters by generating human visual scores for any coding parameters, and may do so on-the-fly during the encoding process without having to offload the metrics generation and evaluation to other hardware (e.g., processors 1110 and/or 1130 of FIG. 11).

It is understood that the above descriptions are for purposes of illustration and are not meant to be limiting.

FIG. 11 illustrates an embodiment of an exemplary system 1100, in accordance with one or more example embodiments of the present disclosure.

In various embodiments, the system 1100 may comprise or be implemented as part of an electronic device.

In some embodiments, the system 1100 may be representative, for example, of a computer system that implements one or more components of FIG. 1.

The embodiments are not limited in this context. More generally, the system 1100 is configured to implement all logic, systems, processes, logic flows, methods, equations, apparatuses, and functionality described herein and with reference to the figures.

The system 1100 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other devices for processing, displaying, or transmitting information. Similar embodiments may comprise, e.g., entertainment devices such as a portable music player or a portable video player, a smartphone or other cellular phones, a telephone, a digital video camera, a digital still camera, an external storage device, or the like. Further embodiments implement larger-scale server configurations. In other embodiments, the system 1100 may have a single processor with one core or more than one processor. Note that the term "processor" refers to a processor with a single core or a processor package with multiple processor cores.

In at least one embodiment, the computing system 1100 is representative of one or more components of FIG. 1. More generally, the computing system 1100 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 1100. For example, a component can be but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 1100 comprises a motherboard 1105 for mounting platform components. The motherboard 1105 is a point-to-point (P-P) interconnect platform that includes a processor 1110, a processor 1130 coupled via a P-P interconnects/interfaces as an Ultra Path Interconnect (UPI), and a device 1119. In other embodiments, the system 1100 may be of another bus architecture, such as a multi-drop bus. Furthermore, each of processors 1110 and 1130 may be processor packages with multiple processor cores. As an example, processors 1110 and 1130 are shown to include processor core(s) 1120 and 1140, respectively. While the system 1100 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 1110 and the chipset 1160. Some platforms may include additional components and some platforms may only include sockets to mount the processors and/or the chipset.

The processors 1110 and 11300 can be any of various commercially available processors, including without limitation an Intel® Celeron®, Core®, Core (2) Duo®, Itanium®, Pentium®, Xeon®, and XScale® processors; AMD® Athlon®, Duron®, and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 1110, and 1130.

The processor 1110 includes an integrated memory controller (IMC) 1114 and P-P interconnects/interfaces 1118 and 1152. Similarly, the processor 1130 includes an IMC 1134 and P-P interconnects/interfaces 1138 and 1154. The WIC's 1114 and 1134 couple the processors 1110 and 1130, respectively, to respective memories, a memory 1112, and a memory 1132. The memories 1112 and 1132 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 1112 and 1132 locally attach to the respective processors 1110 and 1130.

In addition to the processors 1110 and 1130, the system 1100 may include a device 1119. The device 1119 may be connected to chipset 1160 by means of P-P interconnects/interfaces 1129 and 1169. The device 1119 may also be connected to a memory 1139. In some embodiments, the device 1119 may be connected to at least one of the processors 1110 and 1130. In other embodiments, the memories 1112, 1132, and 1139 may couple with the processor 1110 and 1130, and the device 1119 via a bus and shared memory hub.

System 1100 includes chipset 1160 coupled to processors 1110 and 1130. Furthermore, chipset 1160 can be coupled to storage medium 1103, for example, via an interface (I/F) 1166. The I/F 1166 may be, for example, a Peripheral Component Interconnect-enhanced (PCI-e). The processors 1110, 1130, and the device 1119 may access the storage medium 1103 through chipset 1160.

Storage medium 1103 may comprise any non-transitory computer-readable storage medium or machine-readable storage medium, such as an optical, magnetic, or semiconductor storage medium. In various embodiments, storage medium 1103 may comprise an article of manufacture. In some embodiments, storage medium 1103 may store computer-executable instructions, such as computer-executable instructions 1102 to implement one or more of processes or operations described herein, (e.g., process 1000 of FIG. 10). The storage medium 1103 may store computer-executable instructions for any equations depicted above. The storage medium 1103 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 1110 couples to a chipset 1160 via P-P interconnects/interfaces 1152 and 1162 and the processor 1130 couples to a chipset 1160 via P-P interconnects/interfaces 1154 and 1164. Direct Media Interfaces (DMIs) may couple the P-P interconnects/interfaces 1152 and 1162 and the P-P interconnects/interfaces 1154 and 1164, respectively. The DMI may be a high-speed interconnect that facilitates, e.g., eight Giga Transfers per second (GT/s) such as DMI 3.0. In other embodiments, the processors 1110 and 1130 may interconnect via a bus.

The chipset 1160 may comprise a controller hub such as a platform controller hub (PCH). The chipset 1160 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 1160 may comprise more than one controller hub such as a chipset with a memory controller hub, a graphics controller hub, and an input/output (I/O) controller hub.

In the present embodiment, the chipset 1160 couples with a trusted platform module (TPM) 1172 and the UEFI, BIOS, Flash component 1174 via an interface (I/F) 1170. The TPM 1172 is a dedicated microcontroller designed to secure hardware by integrating cryptographic keys into devices. The UEFI, BIOS, Flash component 1174 may provide pre-boot code.

Furthermore, chipset 1160 includes the I/F 1166 to couple chipset 1160 with a high-performance graphics engine, graphics card 1165. The graphics card 1165 may implement one or more of processes or operations described herein, (e.g., process 1000 of FIG. 10), and may include components of FIGS. 1-3 (e.g., the partitioner 104 of FIG. 1, the subtractor 106 of FIG. 1, the transform and quantizer 108 of FIG. 1, the coder 110 of FIG. 1, the inverse transform and quantizer 112 of FIG. 1, the adder 114 of FIG. 1, the prediction unit 116 of FIG. 1, the control 121 of FIG. 1, the VDBOX 202 of FIG. 2 and FIG. 3, etc.). Because of the enhancements described herein to the graphics card 1165, the graphics card 1165 may generate human visual quality metrics for encoded video frames without having to offload the metrics generation, and may identify and select optimal encoding parameters within the graphics card 1165. In other embodiments, the system 1100 may include a flexible display interface (FDI) between the processors 1110 and 1130 and the chipset 1160. The FDI interconnects a graphics processor core in a processor with the chipset 1160.

Various I/O devices 1192 couple to the bus 1181, along with a bus bridge 1180 that couples the bus 1181 to a second bus 1191 and an I/F 1168 that connects the bus 1181 with the chipset 1160. In one embodiment, the second bus 1191 may be a low pin count (LPC) bus. Various devices may couple to the second bus 1191 including, for example, a keyboard 1182, a mouse 1184, communication devices 1186, a storage medium 1101, and an audio I/O 1190.

The artificial intelligence (AI) accelerator 1167 may be circuitry arranged to perform computations related to AI. The AI accelerator 1167 may be connected to storage medium 1101 and chipset 1160. The AI accelerator 1167 may deliver the processing power and energy efficiency needed to enable abundant data computing. The AI accelerator 1167 is a class of specialized hardware accelerators or computer systems designed to accelerate artificial intelligence and machine learning applications, including artificial neural networks and machine vision. The AI accelerator 1167 may be applicable to algorithms for robotics, internet of things, other data-intensive and/or sensor-driven tasks.

Many of the I/O devices 1192, communication devices 1186, and the storage medium 1101 may reside on the motherboard 1105 while the keyboard 1182 and the mouse 1184 may be add-on peripherals. In other embodiments, some or all the I/O devices 1192, communication devices 1186, and the storage medium 1101 are add-on peripherals and do not reside on the motherboard 1105.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device comprising:
   interface circuitry;
   machine-readable instructions; and
   at least one programmable circuit to be programmed based on the machine-readable instructions to:
   generate respective block-based visual quality metrics for pixel blocks of a first encoded video frame corresponding to a source video frame, ones of the pixel blocks including respective pluralities of pixels of the first encoded video frame;
   generate a frame-based visual quality metric based on the pixels, the frame-based visual quality metric representative of frame-level quality of the first encoded video frame;
   generate a score based on the block-based visual quality metrics and the frame-based visual quality metric; and
   re-encode the source video frame based on the score to generate a second encoded video frame corresponding to the source video frame.

2. The device of claim 1, wherein one or more of the at least one programmable circuit is to:
   generate respective first per-pixel visual quality metrics for corresponding pixels in a first pixel block of the pixel blocks;
   generate respective second per-pixel visual quality metrics for corresponding pixels in a second pixel block of the pixel blocks;
   select one of the first per-pixel visual quality metrics to be used to generate a first one of the block-based visual quality metrics corresponding to the first pixel block;
   select one of the second per-pixel visual quality metrics to be used to generate a second one of the block-based visual quality metrics corresponding to the second pixel block; and
   generate a histogram based on the first one of the block-based visual quality metrics corresponding to the first pixel block and the second one of the block-based visual quality metrics corresponding to the second pixel block.

3. The device of claim 1, wherein one or more of the at least one programmable circuit is to:

generate respective first per-pixel visual quality metrics for corresponding pixels in a first pixel block of the pixel blocks;
generate respective second per-pixel visual quality metrics for corresponding pixels in a second pixel block of the pixel blocks;
select one of the first per-pixel visual quality metrics to be used to generate a first one of the block-based visual quality metrics corresponding to the first pixel block;
select one of the second per-pixel visual quality metrics to be used to generate a second one of the block-based visual quality metrics corresponding to the second pixel block; and
generate a diagnostic view of the pixels based on the first one of the block-based visual quality metrics corresponding to the first pixel block and the second one of the block-based visual quality metrics corresponding to the second pixel block.

4. The device of claim 1, wherein the block-based visual quality metrics are first block-based visual quality metrics, and one or more of the at least one programmable circuit is to:
generate respective second block-based visual quality metrics for the first encoded video frame,
wherein the first block-based visual quality metrics are associated with a first encoding layer of the first encoded video frame, and the second block-based visual quality metrics are associated with one or more second encoding layers of the first encoded video frame, the one or more second encoding layers to exclude the first encoding layer.

5. The device of claim 1, wherein one or more of the at least one programmable circuit is to:
select, based on a comparison of the score to a threshold value, coding parameters to be used to re-encode the source frame.

6. The device of claim 1, wherein the score is based on encoding parameters associated with the first encoded video frame.

7. The device of claim 1, wherein the score is a first score based on first coding parameters associated with the first encoded video frame, the block-based visual quality metrics are first block-based visual quality metrics, the frame-based visual quality metric is a first frame-based visual quality, and one or more of the at least one programmable circuit is to:
generate respective second block-based visual quality metrics for the pixel blocks based on second coding parameters;
generate a second frame-based visual quality metric based on the pixels;
generate a second score based on the second block-based visual quality metrics and the second frame-based visual quality metric; and
select the first coding parameters based on the second score.

8. The device of claim 1, wherein the block-based visual quality metrics are class-based metrics based on intra-coding.

9. The device of claim 1, wherein the block-based visual quality metrics are class-based metrics based on inter-coding.

10. The device of claim 1, wherein one or more of the at least one programmable circuit is to generate the score based on a machine learning model.

11. A non-transitory computer-readable medium comprising computer-executable instructions to cause at least one programmable circuit to at least:
generate block-based visual quality metrics for pixel blocks of a first encoded video frame corresponding to a source video frame, ones of the pixel blocks including respective pluralities of pixels of the first encoded video frame;
generate a frame-based visual quality metric based on the pixels, the frame-based visual quality metric representative of frame-level quality of the first encoded video frame;
generate a score based on the block-based visual quality metrics and the frame-based visual quality metric; and
re-encode the source video frame based on the score to generate a second encoded video frame corresponding to the source video frame.

12. The non-transitory computer-readable medium of claim 11, wherein the block-based visual quality metrics are first block-based visual quality metrics, and the computer-executable instructions are to cause one or more of the at least one programmable circuit to:
generate respective second block-based visual quality metrics for the first encoded video frame, wherein the first block-based visual quality metrics are associated with a first encoding layer of the first encoded video frame, and the second block-based visual quality metrics are associated with one or more second encoding layers of the first encoded video frame, the one or more second encoding layers to exclude the first encoding layer.

13. The non-transitory computer-readable medium of claim 11, wherein the computer-executable instructions are to cause one or more of the at least one programmable circuit to:
select, based on a comparison of the score to a threshold value, coding parameters to be used to re-encode the source video frame.

14. The non-transitory computer-readable medium of claim 11, wherein the score is based on encoding parameters associated with the first encoded video frame.

15. The non-transitory computer-readable medium of claim 11, wherein the score is a first score based on first coding parameters associated with the first encoded video frame, the block-based visual quality metrics are first block-based visual quality metrics, the frame-based visual quality metric is a first frame-based visual quality, and the computer-executable instructions are to cause one or more of the at least one programmable circuit to:
generate respective second block-based visual quality metrics for the pixel blocks based on second coding parameters;
generate a second frame-based visual quality metric based on the pixels;
generate a second score based on the second block-based visual quality metrics and the second frame-based visual quality metric; and
selecting the first coding parameters based on the second score.

16. A method comprising:
generating, by graphics processing circuitry of a device, respective block-based visual quality metrics for pixel blocks of a first encoded video frame corresponding to a source video frame, ones of the pixel blocks including respective pluralities of pixels of the first encoded video frame;
generating, by the graphics processing circuitry, a frame-based visual quality metric based on the pixels, the frame-based visual quality metric representative of frame-level quality of the first encoded video frame;

generating, by the graphics processing circuitry, a score based on the block-based visual quality metrics and the frame-based visual quality metric; and re-encoding the source video frame based on the score to generate a second encoded video frame corresponding to the source video frame.

17. The method of claim 16, including:

generating respective first per-pixel visual quality metrics for corresponding pixels in a first pixel block of the pixel blocks;

generating respective second per-pixel visual quality metrics for corresponding pixels in a second pixel block of the pixel blocks;

selecting one of the first per-pixel visual quality metrics to be used to generate a first one of the block-based visual quality metrics corresponding to the first pixel block;

selecting one of the second per-pixel visual quality metrics to be used to generate a second one of the block-based visual quality metrics corresponding to the second pixel block; and generating a histogram based on the first one of the block-based visual quality metrics corresponding to the first pixel block and the second one of the block-based visual quality metrics corresponding to the second pixel block.

18. The device of claim 1, wherein one or more of the at least one programmable circuit is to:

determine a first weight associated with the frame-based visual quality metric based on training data;

determine a second weight associated with the block-based visual quality metrics based on the training data; and aggregate the frame-based visual quality metric and the block-based visual quality metrics based on the first weight and the second weight.

19. The non-transitory computer-readable medium of claim 11, wherein the computer-executable instructions are to cause one or more of the at least one programmable circuit to:

determine a first weight associated with the frame-based visual quality metric based on training data;

determine a second weight associated with the block-based visual quality metrics based on the training data; and aggregate the frame-based visual quality metric and the block-based visual quality metrics based on the first weight and the second weight.

20. The method of claim 16, including:

determining a first weight associated with the frame-based visual quality metric based on training data;

determining a second weight associated with the block-based visual quality metrics based on the training data; and aggregating the frame-based visual quality metric and the block-based visual quality metrics based on the first weight and the second weight.

* * * * *